Patented Oct. 5, 1954

2,691,027

UNITED STATES PATENT OFFICE 2,691,027

1,5-HYDROXY-ACYLAMINO ANTHRAQUINONES

Paul Grossmann, Binningen, and Walter Kern, Sissach, Switzerland, assignors to Ciba Limited, Basel, Switzerland, a Swiss firm No Drawing. Application July 28, 1950, Serial No. 176,551

Claims priority, application Switzerland August 7, 1946

5 Claims. (Cl. 260—377)

This is a continuation in part of our copending applications Serial No. 764,596, filed July 29, 1947 (now U. S. Pat. No. 2,522,034) and Serial No. 791,928, filed December 15, 1947 (now abandoned).

According to this invention valuable dyestuffs of the anthraquinone series are made by treating a mono-hydroxy-mono-aminoanthraquinone, of which the hydroxy group is in the 1-position and the amino group in the 5-position, with an acylating agent which is capable of introducing the radical of an aliphatic mono-carboxylic acid containing at least 3 carbon atoms.

As mono-hydroxy-mono-aminoanthraquinones there may be used in the invention more especially those which in other respects are free from groups imparting solubility. They may, if desired, contain further substituents. It is of advantage, however, to use 1-hydroxy-5-aminoanthraquinone itself.

The acylating agents used in the invention may be, more especially, those which introduce the radical of an aliphatic monocarboxylic acid of low molecular weight containing not less than 3 carbon atoms and not more than 5 carbon atoms, for example, valeric acid, butyric acid and especially propionic acid. On the other hand, there may be used acylating agents which are capable of introducing a radical of higher molecular weight, for example, the radical of caproic acid, caprylic acid, lauric acid or especially palmitic acid, stearic acid or oleic acid. It is of advantage to use as acylating agents functional derivatives of these acids, for example, their acid chlorides or anhydrides.

The reaction may be carried out by methods in themselves known, for example in an inert medium such as pyridine or another tertiary base, acetone, nitrobenzene or chlorobenzene, of if desired, in an excess of the acylating agent, which excess acts as a solvent or diluent. The reaction is advantageously conducted at a raised temperature.

The dyestuffs obtained by the present invention correspond to the general formula

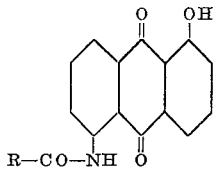

wherein R stands for an acyclic aliphatic hydrocarbon radical containing at least 2 carbon atoms, can be used, for example, as pigments. The derivatives of carboxylic acids of low molecular weight especially after being suitably pasted, which operation may be associated with reprecipitation, for example, from sulfuric acid, are suitable for dyeing or printing structures composed of cellulose esters, superpolyamides or superpolyurethanes, and also, if desired, those composed of polyvinyl compounds. They can be used especially for dyeing or printing cellulose acetate artificial silk and nylon. There are obtained, inter alia, dyestuffs which yield powerful and pure yellow tints of good fastness to light. With an increase in the molecular weight of the acyl radical, markedly from about 6 carbon atoms, the affinity towards cellulose artificial silk decreases, and solubility in fats and oils increases, so that the derivatives of carboxylic acids of high molecular weight can be used for dyeing fatty substances of all kinds, powerful and pure yellow tints being likewise obtained.

For dyeing and printing the kind of fibers referred to and also for other purposes it may be of advantage to use mixtures of two or more dyestuffs according to the present invention, preferably in finely divided form. A fine dispersion may be brought about, as in the case of single dyestuffs, by reprecipitation and/or pasting of the mixtures of the single dyestuffs obtained by acylation of 1-hydroxy-5-aminoanthraquinone. The relative proportions of the mixture components may be chosen within wide limits, such as 4:1 or higher. In mixtures containing more components, e. g. three, the latter may be present in approximately equal proportions or in widely different proportions, for example, 2:1:1 or 3:1:1.

The following examples illustrate the invention, the parts being by weight unless otherwise stated, and the relationship of parts by weight to parts by volume being the same as that of the kilogram to the liter:

Example 1

6 parts of 1-amino-5-hydroxyanthraquinone in 30 parts of ortho-dichlorobenzene and 3.3 parts of dimethylaniline are mixed at 120° C. with 2.6 parts of propionyl chloride, and the whole is stirred at 120° C. for about ½ hour. After the addition of 30 parts of methyl alcohol and cooling, the dyesuff of the formula

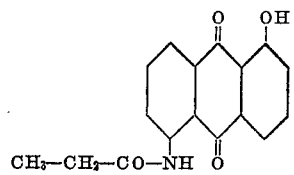

is separated by filtration. After being suitably pasted it dyes cellulose acetate artificial silk fast yellow tints.

Instead of propionyl chloride, there may be caused to react the chloride of another fatty acid whereby the corresponding acyl derivative is obtained.

Example 2

0.5 part of the dyestuff obtained as described in Example 1 is dissolved in 10 parts by volume of sulfuric acid of 90 per cent. strength at 0° C., and the whole is poured on to a mixture of ice and water and filtered. The filter cake so obtained is ground with 1 part of dried sulfite cellulose waste liquor and 1 part of water in a ball mill until a uniform, fine suspension is obtained. The suspension is added to a dyebath containing 9 parts of soap in 3000 parts of water, 100 parts of well wetted cellulose acetate artificial silk are entered at 40° C., the temperature is raised to 80° C., and dyeing is carried on for one hour at 80–85° C. The cellulose acetate artificial silk is dyed yellow tints which are fast to light.

If, instead of 1-propionylamino-5-hydroxyanthraquinone, a mixture of 0.25 part of 1-propionylamino- and 0.25 part of 1-butyrylamino-5-hydroxyanthraquinone, or 0.5 part of a mixture of the same components in the ratio 2:1 or 3:1, is used in this example, a somewhat stronger dyeing of otherwise substantially identical properties is obtained. With a similar result a mixture of 0.16 part each of 1-propionylamino-,1-butyrylamino and 1 - valerylamino - 5 - hydroxyanthraquinone may be used.

What we claim is:
1. A dyestuff of the general formula

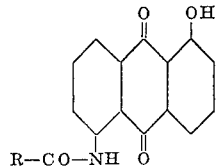

wherein R stands for an acyclic aliphatic hydrocarbon radical containing at least 2 carbon atoms.
2. A dyestuff of the general formula

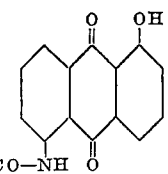

wherein R stands for an acyclic aliphatic hydrocarbon radical containing at least 2 and at the most 4 carbon atoms.
3. A dyestuff of the formula

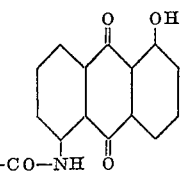

4. A dyestuff of the formula

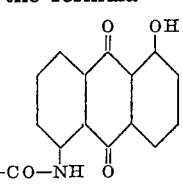

5. A dyestuff of the formula

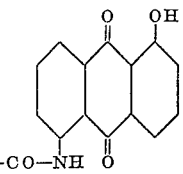

References Cited in the file of this patent

UNITED STATES PATENTS

| Number | Name | Date |
|---|---|---|
| 2,522,034 | Grossman et al. | Sept. 12, 1950 |

FOREIGN PATENTS

| Number | Country | Date |
|---|---|---|
| 148,875 | Germany | Feb. 10, 1903 |
| 211,958 | Germany | July 19, 1909 |
| 225,232 | Germany | Aug. 31, 1910 |